Patented May 27, 1924.

1,495,623

UNITED STATES PATENT OFFICE.

WALTER A. WEST, OF ELKHORN, WISCONSIN.

LIQUEFIED COCOA AND PROCESS OF MAKING SAME.

No Drawing.   Application filed August 27, 1921.   Serial No. 496,086.

*To all whom it may concern:*

Be it known that I, WALTER A. WEST, a citizen of the United States, and a resident of Elkhorn, in the county of Walworth and the State of Wisconsin, have invented certain new and useful Improvements in Liquefied Cocoa and Processes of Making Same, of which the following is a specification, reference being had to the accompanying drawings, forming a part thereof.

The purpose of this invention is to produce a new food product of which the basis is cocoa and of which the characteristic is the liquefaction of the ultimate minute granules or cells of the cocoa which are dissolved apart, but are not individually dissolved or liquefied in any ordinary dissolving or cooking process. It consists of the steps of process and of the mixture of elements hereinafter described, as indicated in the claims.

Heretofore, so far as I am aware, all processes of preparing cocoa for food or beverage have been such as to merely dissolve apart, or separate from each other, the minute granules or cells of which the cocoa is constituted, so that the liquid resulting is in fact only a mixture of the liquid element,—water, or milk, or the like,—employed, with the minute granules or cells of cocoa which are held in suspense in the liquid, and are not individually dissolved, or are not themselves liquefied. All these previous food products may be recognized as being constituted as described, by the fact that, under favorable circumstances, minute sediment of the cocoa will be deposited.

I have ascertained that complete or actual liquefaction of cocoa can be effected by exposing it to an adequately high temperature under circumstances preventing it from burning and causing the melting of the cells or granules; and that, when the melting of these minute cells or granules of cocoa is thus effected, the liquefaction is permanent, and the character as a food product, both as to taste and capacity for mixture with other elements in confection and bakery processes, and in respect to liability or the absence of liability to fermentation, souring or putrefaction, is very essentially different from the character of the cocoa which has not been treated for liquefaction or melting of its ultimate granules or cells.

In preparing cocoa according to this invention, the pulverized, or otherwise mechanically reduced cocoa, is mixed with any aqueous liquid,—water, milk or skim-milk,—producing an ordinary liquid cocoa mixture. This mixture is then heated to a temperature materially above the boiling point of water, which, of course, can be done only by enclosing it so as to restrain expansion and produce pressure upon the liquid in the process of heating. When the liquid mixture is heated to a temperature above 230° F., and preferably approximating 250°, and kept at this temperature for a few minutes, say, from ten minutes to thirty minutes, long enough to permit each individual granule or cell to actually acquire, throughout, the temperature indicated, the granules or cells are found to be melted and completely disintegrated, so that there is no longer the cellular structure but a completely amorphous liquid. When the liquid employed for the mixture is water, milk or skim-milk, there is no tendency for the liquefied cocoa to separate from the mixture liquid; but, on the contrary, the entire mixture is homogeneous and permanent.

The process described for liquefying cocoa by melting, has the effect of sterilizing the entire liquid, so that it may be kept almost indefinitely in unsealed containers without deterioration except by evaporation.

For making a desirable food product, suitable for beverage, any desired amount of sugar may be added to the original mixture before heating, judgment being used to avoid making the liquid so rich with sugar as to cause it to set or become candied when cold. I have found a suitable proportion of sugar to be about 2 pounds to a gallon of liquid mixture.

I claim:

1. The method of producing a liquid cocoa product which consists in thoroughly mixing pulverized cocoa with an aqueous liquid, dissolving sugar in the mixture and then subjecting the mixture in a closed vessel under pressure to a temperature of from 230 degrees, F. to 260 degrees, F.

2. A food product consisting of a permanent mixture of water, milk or skim milk, a sweetening substance and cocoa melted as to its ultimate cells or granules.

In testimony whereof, I have hereunto set my hand at Elkhorn, Wisconsin, this 20th day of August, 1921.

WALTER A. WEST.